(12) United States Patent
Barnes et al.

(10) Patent No.: US 6,954,606 B2
(45) Date of Patent: Oct. 11, 2005

(54) POLYURETHANE COATINGS AND DRIVE ROLLERS INCLUDING THE SAME

(75) Inventors: Johnathan Lee Barnes, Richmond, KY (US); William Hargis Barton, Nicholasville, KY (US); Donald Leo Elbert, Lexington, KY (US); Kathryn Dowlen Mullins, Shelbyville, KY (US); Stacy Marie Pargett, Richmond, KY (US); Ronald Lloyd Roe, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 11 days.

(21) Appl. No.: 10/418,683

(22) Filed: Apr. 18, 2003

(65) Prior Publication Data

US 2004/0205967 A1    Oct. 21, 2004

(51) Int. Cl.⁷ .................. G03G 15/16; G03G 15/00; B21K 1/02
(52) U.S. Cl. .................. 399/313; 29/895.32; 399/162; 428/35.7; 492/56
(58) Field of Search .................. 399/313, 312, 399/303, 162; 29/895.32; 492/56; 428/35.7

(56) References Cited

U.S. PATENT DOCUMENTS

| | | | |
|---|---|---|---|
| 4,134,883 A * | 1/1979 | Mendelsohn et al. | |
| 4,178,094 A | 12/1979 | Silverberg | |
| 4,369,268 A * | 1/1983 | Graziano et al. | |
| 4,862,211 A * | 8/1989 | Kutami et al. | |
| 4,957,959 A * | 9/1990 | Matsumoto et al. | |
| 5,436,708 A | 7/1995 | Dreyfuss et al. | |
| 5,481,338 A * | 1/1996 | Todome | |
| 5,495,317 A * | 2/1996 | Matsuda et al. | 399/313 |
| 5,617,134 A | 4/1997 | Lamothe | |
| 5,619,310 A | 4/1997 | Todome | |
| 5,740,511 A * | 4/1998 | Todome | 399/313 |
| 5,907,741 A | 5/1999 | Matsuzawa et al. | |
| 5,950,059 A | 9/1999 | Sahara | |
| 6,082,002 A | 7/2000 | Belon et al. | |
| 6,112,038 A | 8/2000 | Takahata | |
| 6,141,522 A | 10/2000 | Tsuruoka et al. | |
| 6,160,978 A * | 12/2000 | Tsuruoka et al. | |
| 6,169,870 B1 | 1/2001 | Asakura et al. | |
| 6,356,735 B1 | 3/2002 | Hozumi | |
| 6,668,149 B2 * | 12/2003 | Omata et al. | 399/303 |

FOREIGN PATENT DOCUMENTS

| | | | | |
|---|---|---|---|---|
| JP | 58-055241 A | * | 4/1983 | |
| JP | 02041487 A | * | 2/1990 | |
| JP | 08067734 A | * | 3/1996 | |
| JP | 2000053855 A | * | 2/2000 | C08L 75/04 |
| JP | 2000161451 A | * | 6/2000 | F16H 7/00 |
| JP | 2002173246 A | * | 6/2002 | G03G 15/16 |

* cited by examiner

*Primary Examiner*—Susan Lee
(74) *Attorney, Agent, or Firm*—John A. Brady

(57) ABSTRACT

A drive roller having a polyurethane coating that has a coefficient of friction with respect to a belt effective to drive the belt over the operative life of the belt. The drive roller may be included in an image-forming device to drive a belt.

10 Claims, 1 Drawing Sheet

# POLYURETHANE COATINGS AND DRIVE ROLLERS INCLUDING THE SAME

FIELD OF THE INVENTION

The present invention relates to improved drive rollers suitable, for example, for use in driving a belt in an image-forming device such as an electrophotographic printer. More particularly, the invention relates to drive rollers having a polyurethane coating, and to processes for making the same. The invention is also directed to polyurethane coatings. Further, the invention relates to image-forming devices comprising a drive roller.

BACKGROUND OF THE INVENTION

Many current image-forming devices utilize belts made of materials such as polycarbonate, polyimide, or ethylene tetrafluoroethylene (ETFE), functioning as transport members. Transport members may transport toner, paper, or the like. Drive rollers for these systems, particularly for systems transporting toner, must exhibit tight tolerances with regard to diameter variation because changes in the outer diameter of a drive roller can result in peripheral speed changes of the roller, and, subsequently in the belt, causing misregistration of images at interfaces between the transport member and an image transfer unit. While, theoretically, diameter variances resulting in belt speed changes are compensative, there are significant noncompensative problems which arise from diameter variances across a given roller.

For example, rollers with dimensions yielding either slightly "conical" or "flared" rollers, lead to belt tracking problems which cannot be adjusted for fully by tuning the system during manufacturing. This can lead to early failure of the belt tracking and therefore the whole belt transport unit. Prior art drive rollers, which rely on grinding to achieve specific dimensions within a roller, are costly, require intensive manufacturing set-up and care, and frequent part inspection. While spray-coating allows for the development of more precisely dimensioned rollers, it has heretofore resulted in significant problems with respect to the coefficient of friction (COF) of the drive roller surface relative to the belt being driven. This is of particular concern in toner transport units wherein the drive roller surface must maintain a high relative COF without damaging the belt. Generally, the surface of a drive roller must maintain an adequate coefficient of friction over the operative life of the belt such that the belt does not slip against the drive roller, without degrading the belt.

In the past, rollers which have a rough surface defined by a grit-containing coating adhered to the surface, have been developed to provide long-lasting effective gripping between the roller and a belt. However, use of grit-coated rollers with polymeric belts is problematic because of premature wear of the belt caused by physical abrasion and indentation of the belt surface by the grit. This creates an unacceptable defect in the print.

Drive rollers with grit or bead-blasted surfaces suffer from the same drawbacks as grit-coated rollers, with the exception that they are less costly to manufacture and generally cannot achieve a reasonably high COF. This category includes rollers with some form of texture on the core surface, without any coating other than anodizing or sealing.

Rubber coatings or sleeves for drive rollers are also known and may be manufactured with effective gripping power relative to a belt without abrading the belt surface. Typically, rubber-coated drive rollers are manufactured either by molding rubber around the roller core and then grinding the outer diameter (OD) of the rubber to the necessary tolerances, or by creating rubber sleeves which are then assembled to the core and ground to the necessary dimensions. Various rubbers and other elastomers are used in molding or sleeve-assembly processes, including natural and synthetic isoprene rubbers, other high-friction rubbers such as ethylene-propylene-diene monomer (EPDM) and epichlorohydrin terpolymer rubbers.

However, many currently employed rubber-coated drive rollers do not satisfy all of the roller requisites in a cost-effective fashion. The manufacturing processes as described can be problematic in obtaining necessary diameter consistency throughout the length of the roller, and use of such rollers is labor-intensive, requiring constant inspection and adjustment in order to maintain necessary diameter variation tolerances. Also, functionally determined thermal expansion due to the thickness of the rubber is large, and requires an additional thermistor to be placed in the machine, adding to the overall cost. The thermistor must be in close proximity to the drive roller and must be able to measure the drive roller temperature within 1° Celsius to accurately control thermal expansion of the roller. Cost effective thermistors are generally unable to maintain this level of precision, leading to thermally induced belt speed changes which result in errors in plane to plane color registration of print. The capacity of rubber-coated rollers to undergo thermal expansion, then, adds both undesirable cost and registration uncertainty to the image-forming device.

In addition, rubber coated rollers can be problematic because there is typically at least some migration of curing ingredients, or other components, out of the rubber, which bleed onto the roller surface, lowering the frictional coefficient and contaminating the inside belt surface. Other components conventionally used in rubber compositions, such as processing aids, plasticizers, curatives and oils, also migrate to the inside surface of the belt. Such contaminants attract other contaminants such as dust and toner to localized spots on the belt which can cause print defects by changing the effective resistivity of the belt or physically damaging the belt itself.

Thin, polyurethane sleeves have also been developed, but suffer from being notch-sensitive and vulnerable to ripping with normal handling when the sleeve thickness is less than about 500 μm. Such sleeves are typically comprised of polyurethane with a thickness of about 0.5–1.5 mm. The sleeves stretch over the ends of the roller and provide adequate coefficients of friction. However, because they are typically relatively thick in order to accommodate handling and installation, and are comprised of polyurethane material, they exhibit unacceptable levels of thermally induced expansion.

Thus, it would be advantageous to provide an improved, cost effective drive roller which overcomes disadvantages of the prior art and, for example, maintains a high coefficient of friction (COF) to a belt over the life of the belt, does not damage the belt surface, undergoes very low thermal expansion, and/or does not exhibit chemical migration to the roller surface or the inside surface of the belt. It would also be advantageous to provide a polyurethane coating formulation which is adapted to spray coating application to drive rollers. It would be further advantageous to provide an improved drive roller that can be easily manufactured with precise dimensions and/or which exhibits higher tolerances with respect to characteristics influenced by operating conditions.

SUMMARY OF THE INVENTION

Accordingly, it is an object of the present invention to provide improved drive rollers suitable for use, for example, in image forming devices. It is a further object to provide improved drive rollers which overcome disadvantages of the prior art.

In one embodiment, the present invention is directed to a drive roller comprising a polyurethane coating having a coefficient of friction with respect to a belt effective to drive the belt over the operative life of the belt.

In another embodiment, the invention is directed to a drive roller comprising a core and a coating on the surface of the core, the coating comprising a polyurethane layer comprising the reaction product of a urethane prepolymer, and at least one curative selected from the group consisting of a polyol chain extender with a minimum functionality of 2, and a polyol cross-linking agent with a minimum functionality of 3, and having a coefficient of friction with respect to a belt effective to drive the belt over the operative life of the belt.

In yet another embodiment, the invention is directed to a drive roller comprising a core and a coating on the surface of the core. The coating comprises a polyurethane layer, comprising a reaction product of a urethane prepolymer, and at least one curative selected from the group consisting of a polyol chain extender with a minimum functionality of 2, and a polyol (cross-linking agent with a minimum functionality of 3, wherein the polyurethane layer is comprised of a formulation optimized for application via spray-coating methods.

In yet another aspect, the invention is directed to a polyurethane coating adapted for spray-coating application methods, comprising: a polyurethane layer comprising a reaction product of a urethane prepolymer, at least one curative selected from the group consisting of a polyol chain extender with a minimum functionality of 2, and a polyol cross-linking agent with a minimum functionality of 3, and a catalyst.

A further aspect of the invention is directed to a process for making a drive roller having a polyurethane coating. The process comprises the steps of: preparing a curative solution comprised of at least one curative selected from the group consisting of a polyol chain extender with a minimum functionality of 2, and a polyol cross-linking agent with a minimum functionality of 3, adding a suitable catalyst in a sufficiently diluted concentration, combining this product with a sufficiently diluted urethane prepolymer solution, and applying this product to form at least one polyurethane layer on the surface of the drive roller. A more specific embodiment applies the product via spray coating and drying.

Another aspect of the invention is directed to a method for controlling misregistration due to thermal expansion of a drive roller in an image-forming device, wherein the drive roller is comprised of a polyurethane coating having a thickness which yields a near zero compensated registration error. Generally, thermally induced error is considered compensative by the inclusion of a thermistor and compensation routine that reduces operational temperature changes.

An additional aspect of the invention is directed to a method for controlling misregistration due to thermal expansion of a drive roller in an image forming device, wherein the drive roller is comprised of a polyurethane coating having a thickness tuned such that effects due to thermal expansion of the drive roller are substantially equilibrated with effects due to thermal expansion of at least one photoconductor location part, wherein the need for monitoring and compensating for temperature changes is substantially eliminated.

The present invention is also directed to image-forming devices which comprise an aforementioned drive roller in combination with a belt adapted to be driven by the drive roller.

The drive rollers, coatings, methods and image-forming devices of the invention advantageously employ drive rollers which are relatively easy to manufacture and provide precise and durable service in a relatively inexpensive manner. These, and additional objects, embodiments and advantages are disclosed in further detail in the following detailed description.

BRIEF DESCRIPTION OF THE DRAWINGS

The accompanying drawings incorporated in and forming a part of the specification illustrate several aspects of the present invention, and together with the description and claims serve to explain embodiments of the invention. The drawings are illustrative of specific embodiments of the invention and are not intended to be limiting of the invention defined by the claims. In the drawings:

DETAILED DESCRIPTION

Image-forming devices, such as copiers, facsimile devices and printers, employ drive rollers to transport materials such as toner, paper, images and the like, and/or to convey belts acting as transport members through various units of the devices. Such units typically comprise other rolls and drums that receive, hold, develop, carry, transfer and remove the image, as well as clean the belt. Broadly, a drive roller is a roll which is powered by a source other than a system belt, typically a motor, and drives movement, for example, of a roller-belt system, by conveying the belt through the system. Ideally, the velocity vector of the moving belt is normal to the longitudinal axis of the drive roller and equal in magnitude to the peripheral speed of the drive roller. In systems which employ photoconducting (PC) drum location parts, it is essential that the peripheral speed of a drive roller of a belt adapted for transferring material to or from the PC drum be substantially equal to the peripheral speed of the PC drum so that the belt maintains a consistent speed and multiple image registrations occur in synchronization. In part, this requires that the surface of the drive roller have a high coefficient of friction relative to the belt so that slipping does not occur. The belt is particularly prone to slipping due to drag from operations where image transfer occurs or from conveyance through a belt cleaning station.

Figure 1:
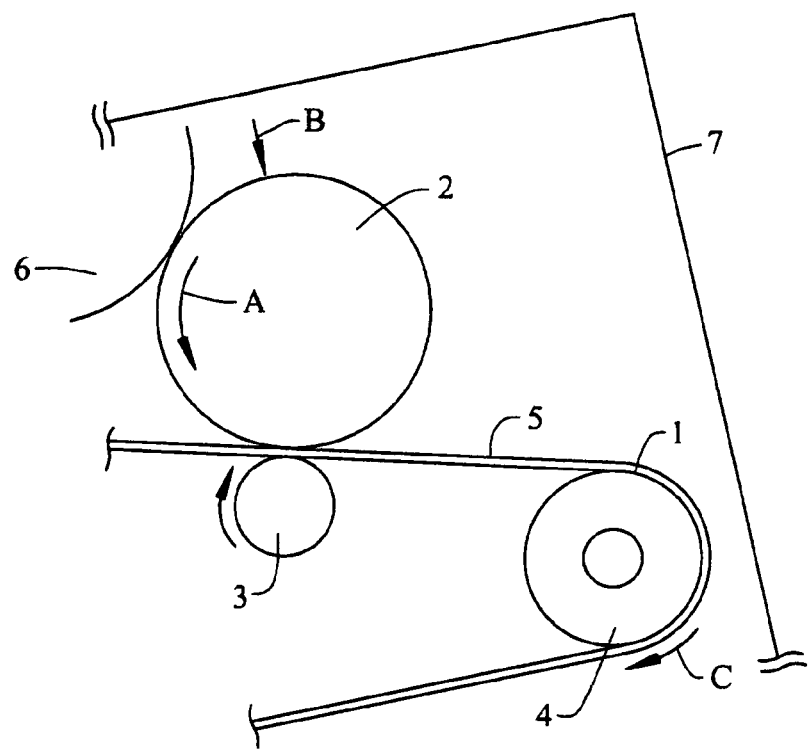
FIG. 1 is a schematic diagram showing a portion of an image forming device utilizing one embodiment of a drive roller of the present invention.

The figures illustrate schematically one embodiment of the drive rollers of the present invention. FIG. 1 represents this embodiment incorporated into an image forming device such as electrophotographic (EP) printer 7. The illustrated image forming device includes a drive roller 4, for driving a belt 5 (which may comprise any belt or roller-conveyed member), in the EP printer 7. Generally, in a typical EP embodiment, the drive roller 4 is powered by a motor and drives the belt 5, sometimes referred to as a transport member, which, if gripped effectively by the drive roller 4, moves at a speed equal to the peripheral speed of the drive roller 4. In this specifically illustrated embodiment, the image carrier takes the form of a photoconducting (PC) drum 2, that is scanned by a laser beam B so that an image signal of a first color is formed on the surface of the PC drum 2. The PC drum 2 is rotated in the direction indicated by arrow A so that a latent image reaches a position facing a developing device contained within a counter-rotating developing unit 6, where it is developed into a toner image. The PC drum 2 carrying the developed toner image continues to rotate.

The belt moves at a speed substantially equal to the peripheral speed of the PC drum 2, in synchrony with the toner developing operation. A primary image transfer roll 3 is in contact with the belt 5 at a position where the PC drum 2 contacts the belt 5, and the toner image is transferred from the PC drum 2 to the belt 5. In a full-color image-forming device, the process ranging from the latent image forming step to the transfer step is repeated, generally four times for four colors. The respective color developing devices are contained within the rotating developing unit 6, whereby the toner images of multiple colors are superposed on the belt to form a full-color toner image. Other stations which are not shown, but may also be arranged along the travel path of the belt include a belt/toner cleaner station and a recording media transfer station. This description is generally of a revolving unit wherein the belt makes one revolution per color. However, the scope of the invention includes application to tandem units wherein the belt receives all four colors in one revolution, or to any unit comprising a drive roller.

As those skilled in the art will readily appreciate, effective gripping power by the drive roller 4 relative to the belt 5 is needed in order to synchronize these events and avoid color registration misalignment. In the image forming device of FIG. 1, the gripping power is achieved through the use of a coating 1 comprising the surface of the drive roller 4. The improved, inventive drive roller 4 comprises a polyurethane coating 1 comprising a polyurethane layer 4.3 which maintains an effective coefficient of friction over the life of the belt 5, thereby maintaining the requisite gripping power with respect to the belt 5.

Figure 2:
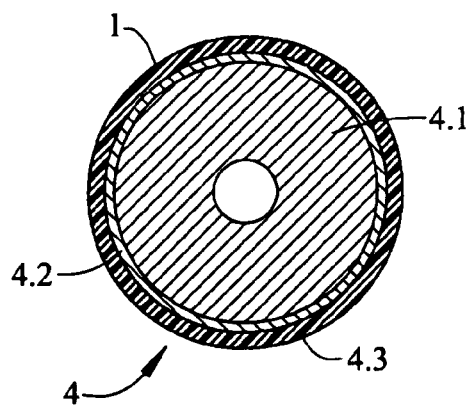
FIG. 2 is a schematic cross-sectional view of the drive roller depicted in FIG. 1, with the dimensions of the surface coating enlarged for purposes of illustration.
Figure 3:
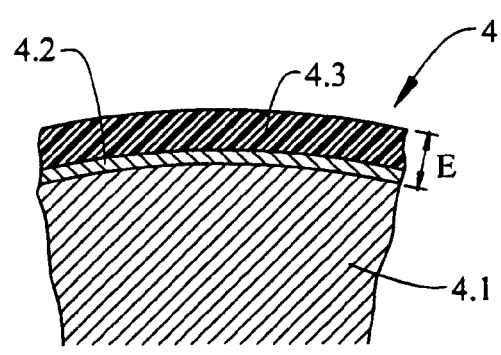
FIG. 3 is a fragmentary unscaled, magnified portion of the drive roller and coated surface schematically depicted in FIG. 2.

FIGS. 2 and 3 schematically depict the coating at the surface of the drive roller 4 in FIG. 1. In both FIGS. 2 and 3, the thickness of the coating, as well as the core, is unscaled and magnified for purposes of illustration. The improved drive roller 4 comprises a core 4.1 and a coating comprising a primer layer 4.2 and a polyurethane layer 4.3 having a coefficient of friction relative to a belt 5 being driven by the drive roller 4, effective to drive the belt 5 over the life of the belt. FIGS. 2 and 3 are not drawn to scale. In one embodiment, the maximum thickness E of the inner and outer layers combined is about 250 microns with a maximum variation tolerance of about +/− 10 microns. Other coating thicknesses, and maximum variation tolerances may, of course, be employed.

The figures show a drive roller in an electrophotographic image-forming device. One skilled in the art will recognize that the drive rollers of the invention may be employed in any drive system in an image-forming device or other device as desired.

In one embodiment, the drive roller comprises a polyurethane coating. In a more specific embodiment, the drive roller comprises a core and a polyurethane coating on the surface of the core. The drive roller has a coefficient of friction (COF) with respect to a belt, effective to drive the belt over the operative life of the belt, which is defined herein as 100 k revolutions of the belt. Effective, as used herein, means that the belt is being driven such that misregistration of images in the final composite print occurs within acceptable levels. An acceptable level of misregistration is defined as within approximately 150 microns, or the point at which resultant image misalignment becomes visible. The COF is a measure of the ease with which two surfaces slide against each other. The dimensionless value of the COF is the ratio of the force required to slide the surfaces to the force perpendicular to the surfaces. The surfaces tested for purposes herein are tested dry (no additional lubricant). The COF is a function of both surfaces, though, polymeric test results are often reported as an attribute of the polymer. It is important in this case to use a standardized metallic surface for comparative purposes. A distinction must also be made between the static COF (at the point of incipient motion) and the dynamic COF (measured at constant velocity). Since the present force of interest is that force which exists at the first detected slip of the belt on the roll, coefficients reported here represent static COF values and were derived according to a COF method similar to ASTM G 143-96. However, the roll was used with a 1" wide belt sample and 180 degrees of belt wrap, with opposing weights of 100 or 200 g. In addition, the test was run manually using a force gauge, rather than according to the automated set up of the ASTM procedure. Any typical COF test is appropriate, the essential requirements being two contacting surfaces, a means of creating relative motion between them, and a system to determine the frictional and normal forces. The critical feature for generating comparative data is continuity of testing conditions, not the specific test employed.

The polyurethane coating of the present invention confers a relatively high COF with respect to the drive roller surface. In one specific embodiment, the COF was greater than about 1.6, relative to belts comprised of material typically used in the image-forming device art (e.g. polycarbonate, ETFE, and polyimide), at the start of operation. Importantly, the coating maintains an adequate COF effective to drive such belts over the life of the belts. In one embodiment, at the end of belt life, the COF is greater than 0.6 relative to all three of the aforementioned belt types. The drop in COF is typically attributable to contamination of the drive roller with toner particles or particles of the belt or other materials which wear during the life of the belt. While most toner contamination can be controlled during the operational life of the belt, there are typically always at least wear particles in the system.

In one embodiment, the polyurethane layer is substantially free of abrasive particles. In a more specific embodiment, the polyurethane coating provides a smooth surface with a maximum average surface roughness value, or Ra, of about 0.3 μm. Ra, or roughness average, is measured according to DIN 4768 using a profilometer and represents the arithmetic mean of the departures of the roughness profile from the mean line, or the integral of the absolute value of the roughness profile over the evaluation length. Therefore, damage to the belt due to abrasion by the drive roller surface is minimized. In addition, components of a fully cured polyurethane coating do not chemically migrate, hence there is essentially no chemical migration from the inventive coating to the drive roller surface or to the inside belt surface over the life of the belt, eliminating or minimizing physical damage which typically occurs with prior art belts caused from contamination and resultant localized attraction of particles in conventional drive rollers.

In one embodiment, the core of the drive roller is comprised of a metallic material, for example, aluminum, and, preferably may be cast or precision-machined into a cylindrical shape, although any shape employable within a drive roller-transport member unit may be employed. Preferably, however, the core is comprised of a metallic material, and most preferably, is comprised of aluminum, having at least one cylindrically shaped portion.

In one embodiment of the invention, the necessary dimensions for use of the belt in a particular image-forming device design, are built into the core so that no post-coating operations such as grinding are necessary. Processes well-known in the art are readily available for creating cores, preferably aluminum cores, fully capable of the tight tolerances required by image-forming applications. Creating a precision aluminum core is less costly than conventional processes of grinding an elastomer coating to precision tolerances. In a further aspect, the precision aluminum core is modified to compensate for coating geometry deviations generated by the coating process, thereby providing a final drive roller of uniform dimension. In a preferred embodiment, such precision modification provides a drive roller with a uniform cross-sectional diameter throughout the length of its cylinder portion.

The inventive coating can be applied in as many layers and to any degree of thickness desired. In one embodiment, the average coating thickness is less than about 250 $\mu$m. In a more specific embodiment for a drive roller driving a transport member in an electrophotographic printer, the coating has an average coating thickness less than about 100 $\mu$m, and an Ra of less than about 1 $\mu$m. Generally, coating thickness is held to that which confers the effective COF or to that which confers a desired geometry, in order to minimize operative tolerances.

Non-limiting examples of coating methods standard to the industry which can be used to produce the drive roller of the present invention include a dip coating method, a spray coating method, and a circular amount regulating type coating method. However, preferred process embodiments include spray coating or circular amount control type coating methods. These methods are well-known in the coating industry. Advantageously, the coatings can be made relatively thin, particularly as compared with polymer sleeves employed in the prior art, as thicknesses typically needed for handling and installation of such sleeves are not required by the present coatings.

Spray coating allows the application of a very thin, consistent coating over the entire functional length of the surface of the drive roller. Some applications of the inventive drive roller require extremely tight operative tolerances. For instance, drive rollers adapted for use in electrophotographic printing devices require a diameter variance within the roll limited to approximately 35 $\mu$m. With some diameter variance created by the core itself the coating must be applied very consistently, with a thickness tolerance range of from +/− about 5 $\mu$m to about 10 $\mu$m. This is easily achieved by the spray-coating process embodiment. Additionally, specific embodiments of the polyurethane coating formulation as described herein are adapted for use in a spray application.

Drive rollers according to the invention including a coating thickness of less than about 250 $\mu$m typically demonstrate extremely low functional thermal expansion, i.e., as low as approximately one-tenth of the functional expansion experienced by typical drive rollers comprised of an EPDM surface. When employing an EPDM or other rubber-type drive roller, typically with an elastomeric thickness of about 1.5 mm, misregistration due to thermal expansion of the roller can typically be 150 to 200 microns per 10° C. temperature change. There are means well-known in the industry to compensate for much of this registration error. Typically, they utilize a thermocouple/thermistor to accurately measure the operative temperature of the drive roller. With accurate temperature measurement and a good compensation algorithm or routine, the misregistration can be reduced to 35–50 microns, sometimes even as low as 25 microns.

However, by employing the present polyurethane coated drive roller, the uncompensated error may be limited to only approximately 25 microns per 10° C. temperature change. This degree of thermally-induced misregistration is small enough to enable compensation of the misregistration due to thermal expansion of the drive roller down to essentially zero. It is also small enough to be within acceptable levels, eliminating the need for a thermistor or compensation routine, thus achieving a substantial means of cost reduction. Alternatively, the expansion can be functionally determined and the thickness of the coating tuned to match the effects of the thermally induced expansion of other image-forming device parts. In one embodiment of the present invention, the thickness is adapted or tuned to match the effects of thermally-induced expansion of the photoconducting drum location parts such that the peripheral speed of the drive roller and the peripheral speed of the photoconducting drum are equilibrated and deviations in belt speed resulting from differential thermal expansion of these integrated parts are substantially eliminated. Hence, the effect of temperature on plane to plane color registration at the belt-photoconductor interface is essentially eliminated.

An additional aspect of the present invention is directed to a polyurethane coating adapted for use in the drive rollers as described. In one embodiment, the coating comprises two layers, a primer layer and a polyurethane layer. The formulations of both layers may be adapted for application via spray-coating technology, although other techniques may be employed. The process of forming either layer can be accomplished in single or multiple application steps.

The polyurethane layer may be applied to a primer layer comprised of an any resin suitable for bonding the polyurethane layer to the roller core, if necessary. In a specific embodiment, the resin is electrically conductive. There are commercially available electrically conductive resins suitable for the intended bonding, including, for example, C-200-91-1 available from Engineered Materials Systems, Inc., which is specifically suitable for bonding the polyurethane layer to an aluminum core. The conductive resin may be diluted with solvents to a solid percentage appropriate for use in spray-coating. The necessity and method of such dilution is well-known in the industrial coating art.

Polyurethane polymers are typically made by the reaction of a diisocyanate with a molecule containing at least two functional groups, i.e., groups containing active hydrogens. An active hydrogen is defined as hydrogen which can be replaced by sodium. The reaction is self-sustaining, without byproduct formation, and is relatively easy to control. The mechanism of polymerization, (diisocyanate+diol→polyurethane) is sometimes referred to as polyaddition. When an isocyanate reacts with an alcohol, a urethane is formed. Polyurethane formation in general can be via one or two component systems. In one-component systems, no additives are needed to effect cure (chain-extending and cross-linking), and mere exposure to effective moisture, water vapor or heat is sufficient. In two-component systems, conditions can be manipulated by means well known in the art of polymer chemistry so that the reaction proceeds no further than the production of the urethane molecule, known as a prepolymer. The urethane prepolymer may be contained until mixture and reaction with a second solution comprising the curative agents. These curative agents, typically including cross-linkers and chain extenders, comprise an active hydrogen, and, generally, in the production of industrial coatings, the main active hydrogen containing compounds are typically hydroxy-functional, with a functionality of 2 or 3, although hydroxy compounds with a functionality as high as eight have been used. Typically, the hydroxy compounds are polymers themselves and are known as polyols.

One embodiment of the present inventive composition employs a urethane prepolymer. In a typical two-component system, the urethane prepolymer precursor component is produced by reacting one equivalent of polyol with up to two equivalents of diisocyanate.

The isocyanates used to form urethane prepolymers can be either aromatic or aliphatic. One embodiment of the present invention comprises a prepolymer formed from one of the two groups of aromatic isocyanates, toluene diisocyanates (TDI), and/or diphenylmethane 4,4' diisocyanate (MDI). The TDI can include the pure 2,4 isomer, or the 2,6 isomer, or a blend thereof. Pure MDI has a functionality of 2, but mixtures of higher functionality, typically crude MDI oligomers, are common and can be used to create a range of functionality and cross-linking potential. A more specific embodiment comprises a urethane prepolymer formed from TDI. Both TDI and MDI are widely known and available in the industry.

The second ingredient in formulation of the urethane prepolymer is the functional group providing active hydrogen. In one embodiment, the present invention employs polyols. The particular polyol determines the structural backbone of the final polyurethane macromolecule. One specific embodiment of the composition utilizes prepolymers formed from either polyether or polyester polyols, and a more specific embodiment utilizes polyether polyols.

Once a prepolymer is formed, the % NCO, designating the amount of reactive NCO within the prepolymer is determined. Typically, this value is provided by the manufacturer on the Certificate of Analysis that accompanies proprietary prepolymers. In one embodiment utilizing proprietary prepolymers, a desired % stoichiometry is selected and the spray coating formulation is determined based on the prepolymer % NCO and the hydroxyl equivalent weights of appropriate curatives. In a more specific embodiment, the formation of the final prepolymer is conducted at a relatively low percent NCO, no greater than about 5.0.

Prepolymers derived from the methods and meeting the specifications described above are widely known and available in the polymer arts. Once a prepolymer is formed, it is contained, usually within a solvent solution, and combined with the second component, the curative solution, just prior to application to the drive roller surface. Polyurethane curatives include, generally, chain extenders and cross-linkers. Cross-linking is a mechanism for decreasing the molecular freedom of the polymer chain that links the polymer chains together through covalent or ionic bonds to form a network. Cross-linking in the present invention is accomplished chemically during the polymerization. Elastomers in general are characterized by having a very low relative cross-linking density together with a highly flexible main chain. Cross-linking agents are low molecular weight compounds containing active hydrogen, and with a minimum functionality of 3—such as triols & tetrols. Chain extenders are low molecular weight difunctional compounds containing active hydrogen. Non-limiting examples of suitable commercially available chain extenders include 1,4-butane diol, and low molecular weight (MW 400–700) polyether diols. The present inventive coating comprises at least one curative selected from the group consisting of polyol chain extenders with a minimum functionality of 2, and polyol cross-linking agents with a minimum functionality of 3. In one specific embodiment, the polyol chain extender to polyol cross linking agent occurs in a molar ratio of from about 3:1 to about 19:1. In a more specific embodiment, the polyol chain extender comprises polyether diol and the polyol cross-linking agent comprises ethoxylated-trimethylol propane (ethoxy-TMP), in a molar ratio of about 19:1.

In one embodiment, the polyurethane formulation which confers an effective COF is specifically adapted for use in spray-coating methods. Heretofore, while there were many polyurethane formulations capable of being spray-coated, the properties which rendered the polyurethanes sprayable also made them unacceptably tacky for use on a drive roller. In this embodiment, the prepolymer selected has an % NCO no greater than about 5, and the curatives selected are either those with a low equivalence weight (molecular weight of the curative divided by the number of functional groups, lower than 1500 g per mole), or those wherein the functional groups are localized in one region of the molecule. By "localized within one region of the molecule," it is meant that for any curative molecule, so long as there is a region of the molecule such that the molecular weight to functionality ratio within that region is less than or equal to 1500 g/mol, the curative is within the selected scope. The amount of curative added to the prepolymer solution is that which yields a stoichiometry greater than about 80% (i.e. greater than 8 curative reactive groups for every 10 available isocyanate groups). The catalyst is diluted to a concentration of no greater than about 5% solids in solvent, and added sequentially last, to the curative solution, such that there are no localized areas of high concentration. In one specific embodiment, dibutyltin dilaurate (DBTDL) was selected as the catalyst. The DBTDL was diluted to approximately 1% solids in solvent, and an amount was added such that the DBTDL comprised about 0.1% by weight of the polyurethane solution just prior to application.

The present inventive coating is adapted for application on any image forming device component. However, in one embodiment, the coating comprises the surface of a drive roller adapted to drive a belt. In a further embodiment, the coating comprises a polyurethane layer, and the polyurethane layer is substantially free of abrasive particles, and exhibits an effective coefficient of friction relative to the belt over the operational life of the belt. In a specific embodiment, the coating has an average total thickness of less than about 250 µm with a coating thickness variance of less than +/−25 µm. In a further embodiment adapted for use on a drive roller driving a belt functioning as a transport member, the coating has an average thickness of less than about 100 µm, with a thickness variance of less than +/−10 µm, and an average surface roughness (Ra) of less than about 3 µm, and even more specifically, with an Ra of less than about 1 µm.

The aspect of the invention directed toward a process of making a drive roller comprising a polyurethane coating, comprises the steps of: preparing a curative solution comprised of at least one curative selected from the group consisting of a polyol chain extender with a minimum functionality of 2, and a polyol cross-linking agent with a minimum functionality of 3, adding a suitable catalyst in a sufficiently diluted concentration, combining this product with a sufficiently diluted urethane prepolymer solution, and then applying the resultant product to form at least one polyurethane layer on a surface of the drive roller.

In one process embodiment, the polyurethane layer applied via spray-coating and drying steps, with post-spray drying taking place at elevated temperatures effective to complete curing and remove solvent for an effective period of time. What constitutes "effective" is determined by the conditions present, but the range has a very low tolerance and is readily discernable by an ordinary practitioner in the art of polymeric coating.

EXAMPLE 1

The following example illustrates one embodiment of the present inventive coating. In this example and throughout the present specification and claims, parts, percentages and ratios are by weight unless otherwise specified. Formulation of a primer layer involves diluting a suitable resin (for example, C-200-91-1 from Engineered Materials Systems, Inc., provided as approximately 32% solids) to a level of approximately 16.7% solids using a 40/60 mixture by weight of anhydrous dimethylacetimide (DMAC) and anhydrous methyl ethyl ketone (MEK), two well-known and widely available organic solvents. The primer layer is sprayed onto an aluminum cylindrical core and allowed to dry to remove the solvent. The polyurethane layer is prepared as a two component system employing two different solutions which are combined just prior to application. Each solution is prepared to comprise a 20% solid solution in order to be compatible with spray-coating specifications. The prepolymer solution is formed from 50 g Polyether/TDI based polyurethane prepolymer with a percent NCO=4.2 (available as Adiprene L 100 from Uniroyal Corp.), and 200 g tetrahydrofuran (THF) as a suitable solvent. The curative polyol solution comprises 3.75 g ethoxylated trimethylolpropane (ethoxy-TMP) as the cross-linking agent (available as Polyol TP30 LW from Perstorp Specialty Chemicals, Inc.), 9.44 g polyether diol as the chain-extending agent (available as Poly G 55-28 from Arch Chemicals, Inc.), 56.5 g THF as a suitable solvent and 0.06 g dibutyltin dilaurate (DBTDL) as a suitable catalyst. The prepolymer and curative solutions are mixed, and the resultant solution is sprayed immediately onto the primer layer of the drive roller. The final thickness of the total coating is approximately 50$\mu$. The roller is heated to 104° C. for 16 hours to effect cure and remove solvent, but other temperatures and times may be effectively equivalent. The completed drive roller exhibits a COF of greater than 1.6 relative to three belt types, polycarbonate, ETFE, and polyimide, at the start of operation. The drive roller maintains an adequate COF, greater than 0.6 to all three belt types after 100 k revolutions of the belt. The drive roller exhibits a surface Ra of approximately 0.3$\mu$ and the polyurethane layer is essentially free of abrasive particles. Testing demonstrates an absence of chemical migration from this coating to the belt surfaces.

It is therefore evident that the present invention provides a drive roller, a process for making a drive roller, a coating, and an image-forming device employing the foregoing, that fully satisfy the objects, aims and advantages set forth. While this invention has been described in conjunction with specific embodiments thereof, there are many alternatives, modifications and variations which will be apparent to those skilled in the art. Accordingly, the invention is intended to embrace all such alternatives, modifications and variations as fall within the spirit and broad scope of the appended claims.

What is claimed is:

1. A drive roller comprising a core and a coating on the surface of the core, the coating comprising: a polyurethane layer comprising the reaction product of a urethane prepolymer, and at least one curative selected from the group consisting of a polyol chain extender with a minimum functionality of 2, and a polyol cross-linking agent with a minimum functionality of 3, and having a coefficient of friction with respect to a belt effective to drive the belt over the operative life of the belt, wherein the coating has an average thickness of less than about 100 $\mu$m and the coating exhibits a surface Ra of less than about 1 $\mu$m.

2. An image forming device comprising the drive roller as recited in claim 1, and a belt adapted to be driven by the drive roller.

3. A drive roller comprising a core and a coating on the surface of the core, the coating comprising: a spray-coated polyurethane layer comprising the reaction product of a urethane prepolymer, and at least one curative selected from the group consisting of a polyol chain extender with a minimum functionality of 2, and a polyol cross-linking agent with a minimum functionality of 3, wherein the polyol chain extender comprises polyether diol and the polyol cross-linking agent comprises ethoxylated-trimethylol propane (ethoxy-TMP).

4. A drive roller as recited in claim 3 wherein the exthoxy-TMP and polyether diol exist in a stoichiometric ratio of ethoxylated-TMP to polyether diol of from about 3:1 to about 19:1.

5. An image forming device comprising the drive roller as recited in claim 4, and a belt adapted to be driven by the drive roller.

6. An image forming device comprising the drive roller as recited in claim 3, and a belt adapted to be driven by the drive roller.

7. A polyurethane coating adapted for application via spray-coating, comprising: a polyurethane layer, comprising the reaction product of a urethane prepolymer, at least one curative selected from the group consisting of a polyol chain extender with a minimum functionality of 2, and a polyol cross-linking agent with a minimum functionality of 3, and a catalyst, wherein the curative exhibits a molecular weight to functionality ratio of less than 1500 grams per mole, or wherein the curative functionality is localized in one region of the curative.

8. A polyurethane coating adapted for application via spray-coating, comprising: a polyurethane layer, comprising the reaction product of a urethane prepolymer, at least one curative selected from the group consisting of a polyol chain extender with a minimum functionality of 2, and a polyol cross-linking agent with a minimum functionality of 3, and a catalyst, wherein the curative comprises reactive groups and the urethane prepolymer comprises available isocyanate groups, with a stoichiometry of greater than about 80%.

9. A polyurethane coating adapted for application via spray-coating, comprising: a polyurethane layer, comprising the reaction product of a urethane prepolymer, at least one curative selected from the group consisting of a polyol chain extender with a minimum functionality of 2, and a polyol cross-linking agent with a minimum functionality of 3, and a catalyst, wherein the polyol chain extender comprises polyether diol and the polyol cross-linking agent comprises ethoxylated-trimethylol propane (ethoxylated-TMP).

10. A polyurethane coating adapted for application via spray-coating, comprising: a polyurethane layer, comprising the reaction product of a urethane prepolymer, at least one curative selected from the group consisting of a polyol chain extender with a minimum functionality of 2, and a polyol cross-linking agent with a minimum functionality of 3, and a catalyst, wherein exthoxylated-TMP and polyether diol exist in a stoichiometric ratio of ethoxylated-TMP to polyether diol of from about 3:1 to about 19:1.

* * * * *